United States Patent
Tago et al.

(10) Patent No.: US 7,742,135 B2
(45) Date of Patent: Jun. 22, 2010

(54) LIQUID CRYSTAL DISPLAY DEVICE CAPABLE OF PREVENTING REFLECTANCE AND WHITE BALANCE VALUE FROM SHIFTING

(75) Inventors: Keiji Tago, Fukaya (JP); Jin Hirosawa, Saitama (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 234 days.

(21) Appl. No.: 11/956,948

(22) Filed: Dec. 14, 2007

(65) Prior Publication Data
US 2008/0218668 A1 Sep. 11, 2008

(30) Foreign Application Priority Data
Mar. 5, 2007 (JP) .............................. 2007-054729

(51) Int. Cl.
G02F 1/139 (2006.01)
G02F 1/1335 (2006.01)
G02F 1/1337 (2006.01)

(52) U.S. Cl. ...................... 349/114; 349/109; 349/129; 349/178

(58) Field of Classification Search ................. 349/106, 349/108, 109, 114, 128, 129, 130, 178; 345/87, 345/88
See application file for complete search history.

(56) References Cited

U.S. PATENT DOCUMENTS

| 2006/0050209 A1 | 3/2006 | Higa |
| 2007/0182893 A1 | 1/2007 | Yoshida et al. |
| 2007/0200990 A1 | 2/2007 | Hirosawa et al. |
| 2008/0170188 A1* | 7/2008 | Fan Jiang et al. ........... 349/109 |

FOREIGN PATENT DOCUMENTS

| CN | 1743923 A | 3/2006 |
| JP | 2006-72086 | 3/2006 |
| KR | 10-2005-0087501 | 8/2005 |
| KR | 10-2006-0103411 | 9/2006 |

OTHER PUBLICATIONS

U.S. Appl. No. 11/889,163, filed Aug. 9, 2007, Norihiro Yoshida.
U.S. Appl. No. 12/028,526, filed Feb. 8, 2008, Yoshida, et al.

* cited by examiner

*Primary Examiner*—Dung T Nguyen
*Assistant Examiner*—Tai Duong
(74) *Attorney, Agent, or Firm*—Oblon, Spivak, McClelland, Maier & Neustadt, L.L.P.

(57) ABSTRACT

In the liquid crystal display device, a transparent area is formed in a part of the color filter layer which opposes the reflective electrode. A part of the transparent area opposes a part of the structure formed to make liquid crystal molecules incline. The structure and the transparent area are configured to keep a ratio constant, the ratio being a ratio between a size of the transparent area's part opposing the structure's part and a size of the rest of the transparent area.

33 Claims, 3 Drawing Sheets

FIG. 2
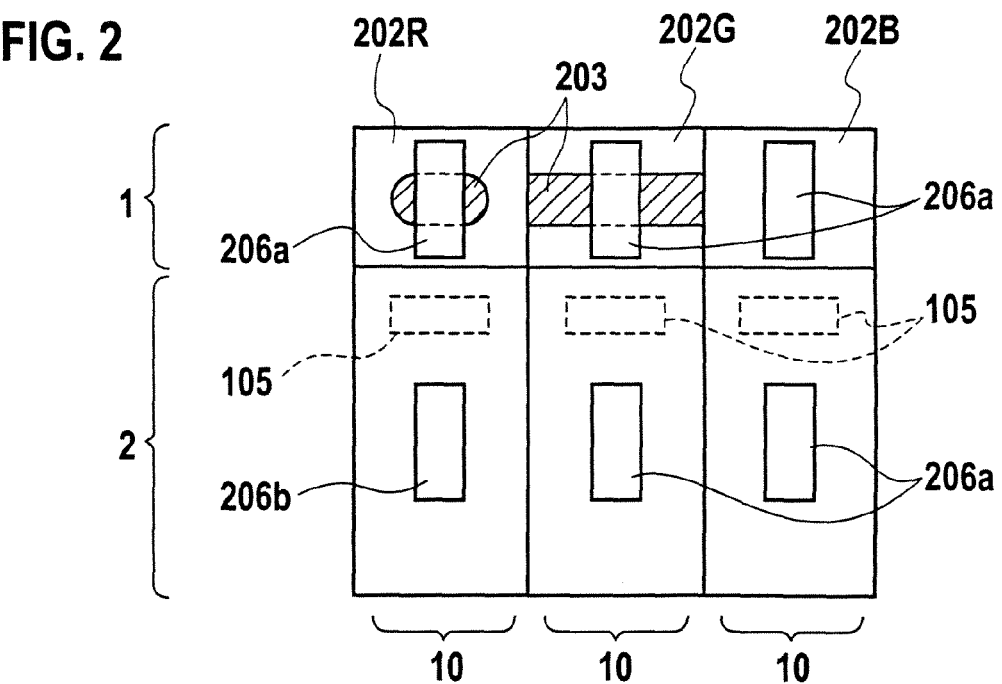
FIG. 3A
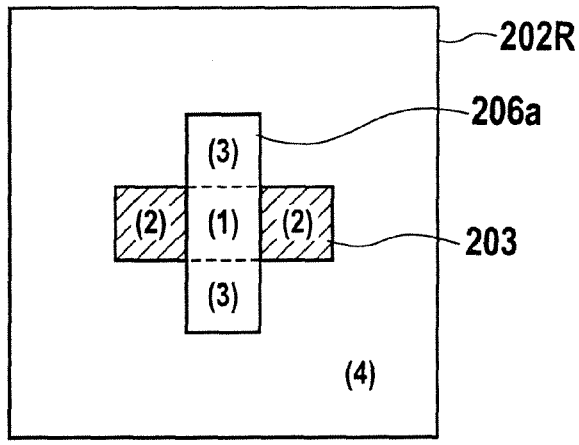
FIG. 3B
|  | (1) | (2) | (3) | (4) |
|---|---|---|---|---|
| PROTUBERANCE | YES | NO | YES | NO |
| COLOR FILTER LAYER | NO | NO | YES | YES |
| RATIO IN SIZE | 3% | 6% | 6% | 85% |

|  | (1) | (2) | (3) | (4) |
|---|---|---|---|---|
| PROTUBERANCE | YES | NO | YES | NO |
| COLOR FILTER LAYER | NO | NO | YES | YES |
| RATIO IN SIZE | 3% | 17% | 0% | 80% |

LIQUID CRYSTAL DISPLAY DEVICE CAPABLE OF PREVENTING REFLECTANCE AND WHITE BALANCE VALUE FROM SHIFTING

CROSS-REFERENCE TO RELATED APPLICATIONS

This application is based upon and claims the benefit of priority from Japanese Patent Application No. 2007-054729 filed on Mar. 5, 2007; the entire contents of which are incorporated herein by reference.

BACKGROUND OF THE INVENTION

1. Field of the Invention

The present invention relates to a liquid crystal display device capable of preventing a reflectance and a white balance value from shifting.

2. Description of the Related Art

In recent years, a semi-transmissive type liquid crystal display device, which has transmissive display areas and reflective display areas, is used in a mobile information device such as a mobile phone and a mobile music player.

The transmissive display areas enable the device to display an image using a light from a backlight. The reflective display areas enable the device to display an image using an ambient light. Therefore, the device is good in visibility not depending on the brightness of the environment.

A kind of the device called a multi-domain vertical alignment (MVA) liquid crystal display device has domains in the each area, inclination of liquid crystal molecules being different in the each domain.

To form the domains, protuberances are formed on electrodes for example. To compensate both decrease in transmittance of light caused by the protuberances and decrease in reflectance caused by the decrease in transmittance, transparent areas are formed in color filter layers, a part of the each transparent area opposing a part of the corresponding protuberance. Thus, a desirable reflectance is obtained.

In addition, by making the each transparent area's size and position correspond to the color of the color filter layer in which the transparent area is formed, a desirable white balance value is obtained.

However, when manufacturing the device, if a relative position between the protuberance and the transparent area varies, the reflectance and the white balance value may shift.

SUMMARY OF THE INVENTION

A liquid crystal display device according to the present invention is characterized by including: an array substrate and an opposing substrate; a liquid crystal layer formed between the array substrate and the opposing substrate; transmissive electrodes formed in the array substrate; reflective electrodes formed in the array substrate; a color filter layer formed in the opposing substrate; an opposing electrode formed on the color filter layer; transparent areas which do not add colors to light, the each transparent area being formed in a corresponding part of the color filter layer which opposes a corresponding reflective electrode; and structures configured to make liquid crystal molecules in the liquid crystal layer incline, the each structure being formed either on a corresponding reflective electrode or on a corresponding part of the opposing electrode which opposes a corresponding reflective electrode, wherein a part of the each transparent area opposes a part of the corresponding structure, and the each structure and the each transparent area are configured to keep a ratio constant, the ratio being a ratio between a size of the transparent area's part opposing the structure's part and a size of the rest of the transparent area.

In the present invention, even if a relative position between the structure and the transparent area varies when manufacturing the device, the ratio is maintained to keep a chromaticity of color and a reflectance. As a result, the reflectance and a white balance value are prevented from shifting.

BRIEF DESCRIPTION OF THE DRAWINGS

FIG. 2 illustrates a plan view of the pixel in FIG. 1;

FIG. 3A roughly illustrates a protuberance, a transparent area and a color filter layer in a reflective display area in FIG. 2;

FIG. 3B illustrates a table including data of each area in FIG. 3A, the data include whether the protuberance and the color filter layer exist and a ratio in size of the corresponding area;

DESCRIPTION OF THE EMBODIMENT

First Embodiment

Figure 1:
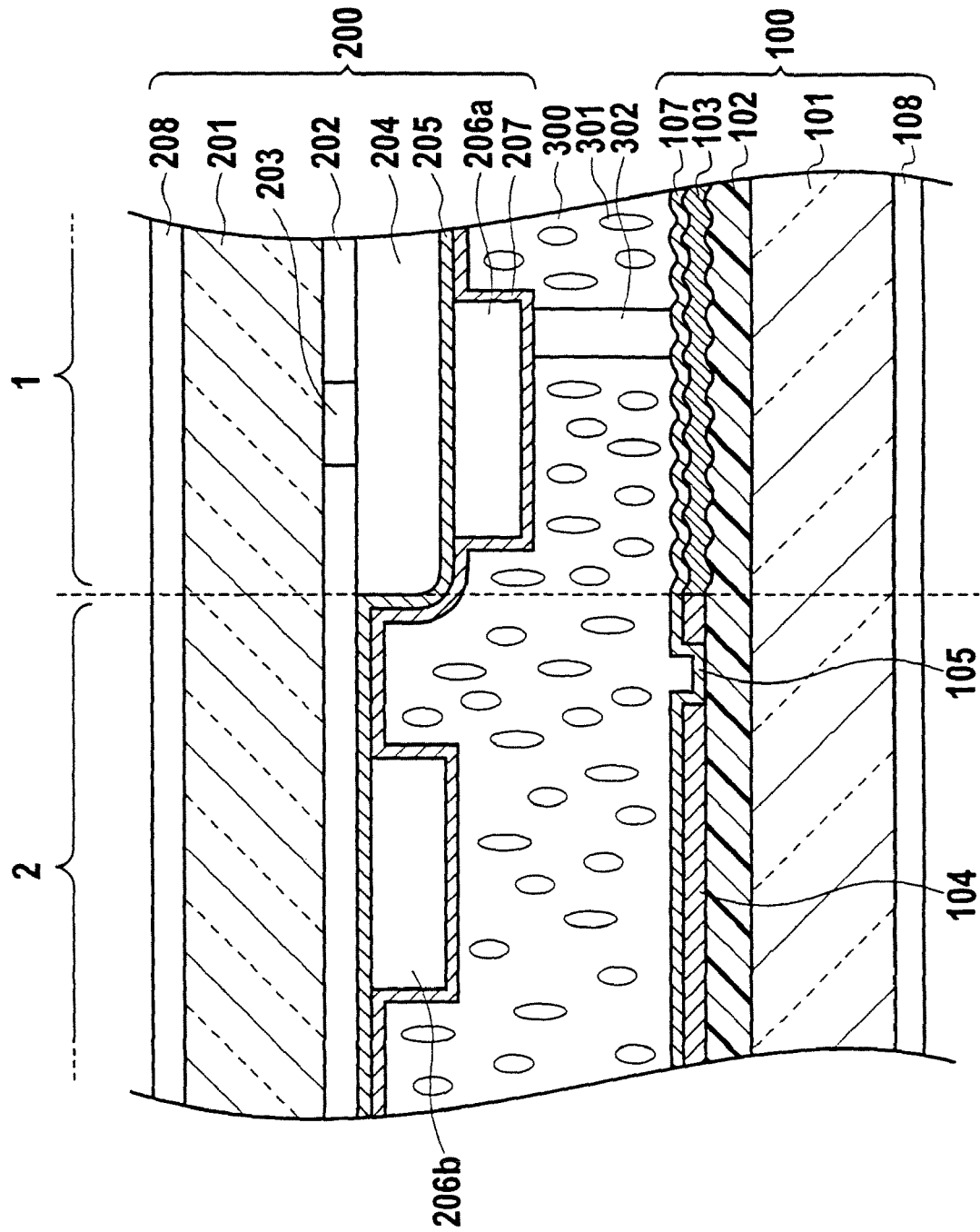
FIG. 1 illustrates a cross section view of a pixel of a liquid crystal display device according to a first embodiment of the present invention.

As illustrated in FIG. 1, the liquid crystal display device according to the first embodiment has an array substrate 100, an opposing substrate 200 opposing the array substrate 100 and a liquid crystal layer 300 formed between the array substrate 100 and the opposing substrate 200. The liquid crystal layer 300 consists of liquid crystal molecules 301 having a negative dielectric anisotropy for example. Although not illustrated, a backlight is faced to the backside of the array substrate 100.

A transparent resin layer 102 is formed on a glass substrate 101 of the array substrate 100. A reflective electrode 103 having ruggedness is formed on the resin layer 102, the reflective electrode 103 being formed in the reflective display area 1 of a pixel. A transmissive electrode 104 is formed on the resin layer 102, the transmissive electrode 104 being formed in the transmissive display area 2 of the pixel The transmissive electrode 104 is partially removed to form a slit 105. The slit 105 is, for example, 10 micrometer in length and is 4 micrometer in width.

The reflective electrode 103 and the transmissive electrode 104 are used as a pixel electrode. Although not illustrated, a thin film transistor used to impress a voltage to the pixel electrode, wiring such as signal line and scanning line connected to the transistor are formed on the resin layer 102.

A vertical orientation film 107 is formed on the reflective electrode 103 and the transmissive electrode 104. A polarizing plate 108 is put on a backside of the glass substrate 101.

A color filter layer 202 is formed on a glass substrate 201 of the opposing substrate 200, the color filter layer 202 opposing the reflective electrode 103 and the transmissive electrode 104.

A transparent area 203, which do not add colors to light, is formed in a part of the color filter layer 202, the part opposing the reflective electrode 103.

A transparent cell-gap adjusting layer 204 is formed on the color filter layer 202 and the transparent area 203, the transparent cell-gap adjusting layer 204 being formed in the reflective display area 1. The cell-gap adjusting layer 204 consists of dielectric for example.

A cell-gap length in the reflective display area 1 is made shorter than a cell-gap length in the transmissive display area 2 by forming the cell-gap adjusting layer 204. That is, the pixel has a multi-gap structure.

An opposing electrode 205 is formed on the color filter layer 202 and the cell-gap adjusting layer 204, the opposing electrode 205 opposing the reflective electrode 103 and the transmissive electrode 104. For the opposing electrode 205, an electro-conductive material having high penetration ratio of lights, for example, Indium Tin Oxide (ITO) is used.

As structures to make the liquid crystal molecules 301 in the liquid crystal layer 300 incline desirably, protuberances 206a and 206b are formed on the opposing electrode 205, the protuberance 206a being formed on a part of the opposing electrode 205 which opposes the reflective electrode 103, the protuberance 206b being formed on a part of the opposing electrode 205 which opposes the transmissive electrode 104. Each of the protuberances 206a and 206b is, for example, 1 micrometer in height and is 6 micrometer in width. Each of the protuberances 206a and 206b consists of dielectric for example.

The device is a multi-domain vertical alignment (MVA) liquid crystal display device having domains made by the slit 105 and the protuberances 206a and 206b, inclination of the liquid crystal molecules being different in the each domain.

A vertical orientation film 207 is formed on the opposing electrode 205 and the protuberances 206a and 206b.

By making a gap between the protuberances 206a and 206b, an amount of light passing through the liquid crystal layer 300 increases where the gap is made. By the slit 105 opposing the gap, the liquid crystal molecules 301 in the gap incline desirably.

Note that, instead of the protuberance 206a, a protuberance may be formed on the reflective electrode 103. Instead of the protuberance 206b, a protuberance may be formed on the transmissive electrode 104.

Instead of the protuberance 206a, the reflective electrode 103 or a part of the opposing electrode 205 opposing the reflective electrode 103 may partially be removed to form a slit having a form of a rectangle for example. Instead of the protuberance 206b, the transmissive electrode 104 or a part of the opposing electrode 205 opposing the transmissive electrode 104 may partially be removed to form a slit. Even if the structures form such slits, the liquid crystal molecules 301 incline desirably.

If a voltage impressed between the pixel electrode and the opposing electrode 205 is zero or less than a threshold, the liquid crystal molecules 301 orient in a direction vertical to the array substrate 100 and the opposing substrate 200.

If an impressed voltage is equal to or more than the threshold, the liquid crystal molecules 301 incline to the substrates or orient approximately in a direction parallel to the substrates. Direction of the liquid crystal molecules 301 mostly depends on a direction of electric flux lines.

A spacer 302 is put between the array substrate 100 and the opposing substrate 200. The spacer 302, for example, has a shape of a pillar and is 2 micrometer in height.

In the device, a light reflected by the reflective electrode 103 or a light came out from the backlight and then passed through the transmissive electrode 104 passes through the liquid crystal layer 300.

A voltage is impressed between the pixel electrode and the opposing electrode 205. In the liquid crystal layer 300, the liquid crystal molecules 301 oriented vertically incline by electric field caused by the voltage.

An amount of the light corresponds to the inclination of the liquid crystal layer 300. A gradation obtained thus changes according to change in the voltage.

Thus, an image is displayed by a reflective or transmissive mode.

As illustrated in FIG. 2, the pixel consists of a sub-pixel 10 having a red color filter layer 202R, a sub-pixel 10 having a green color filter layer 202G and a sub-pixel 10 having a blue color filter layer 202B.

The color filter layer 202 is divided into three groups of areas, the areas of the first group being the red color filter layers 202R capable of adding red color to light, the areas of the second group being the green color filter layer 202G capable of adding green color to light, the areas of the third group being the blue color filter layer 202B capable of adding blue color to light.

In the sub-pixel 10 having the red color filter layer 202R and in the sub-pixel 10 having the green color filter layer 202G, the transparent area 203 is formed in a part of the color filter layer, the part being located in the reflective display area 1.

Regardless of color, a part of the color filter layer is located in the reflective display area 1 and the rest of the color filter layer is located in the transmissive display area 2.

As illustrated in FIG. 3A, the transparent area 203 formed in the color filter layer 202R crosses the corresponding protuberance 206a. Although not illustrated, the transparent area 203 formed in the color filter layer 202G crosses the corresponding protuberance 206a as well.

In other words, a part of the transparent area opposes a part of the corresponding protuberance.

In the area of the protuberance 206a, transmittance of light is decreased. On the contrary, in the transparent area 203, transmittance of light is increased. Thus, the transparent area 203 prevents reflectance from decreasing.

An area designated by (1) in FIG. 3A has a protuberance though the area does not have a color filter layer as in FIG. 3B. The area's ratio in size is about 3%. Each of areas designated by (2) in FIG. 3A has neither a protuberance nor a color filter layer as in FIG. 3B. The areas' ratio in size is about 6%. Each of areas designated by (3) in FIG. 3A has both a protuberance and a color filter layer as in FIG. 3B. The areas' ratio in size is about 6%. An area designated by (4) in FIG. 3A has a color filter layer though the area does not have a protuberance as in FIG. 3B. The area's ratio in size is about 85%. Thus, a chromaticity of red color and a reflectance are set desirably.

It is assumed that a size of the area designated by (1) is S1 and a size of the areas designated by (2) is S2, even if a relative position between the protuberance 206a and the transparent area 203 varies when manufacturing the device, the ratio of S1 and S2, which is a ratio between the size of the transparent area's part opposing the structure's part and the size of the rest of the transparent area is maintained. For example, if the transparent area 203 is shifted towards right in FIG. 3A, one of the areas designated by (2) becomes larger while the other area becomes smaller. Thus, the ratio is maintained. Thereby, the chromaticity of red color and the reflectance are maintained.

Ratios are also set in the sub-pixel having the green color filter layer to set a chromaticity of green color and a reflectance desirably. The chromaticity of green color and the reflectance are also maintained.

Thus, a desirable reflectance and a white balance value are set and the reflectance and the white balance value are prevented from shifting even if a relative position between the protuberance and the transparent area varies.

Each of the protuberance and the transparent area is made in a form of an oval or a rectangle so as to cross each other. But, if they cross each other, at least one of them may be made in a form of a circle or a square.

Second Embodiment

Figures 4A, 4B:
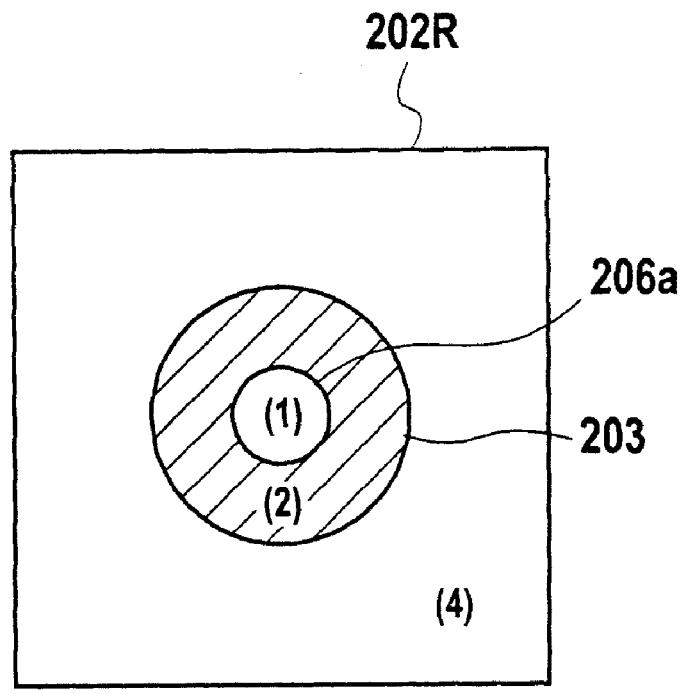
FIG. 4A illustrates a protuberance, a transparent area and a color filter layer in a reflective display area in a liquid crystal display device according to a second embodiment.
FIG. 4B illustrates a table including data of each area in FIG. 4A, the data include whether the protuberance and the color filter layer exist and a ratio in size of the corresponding area.

A basic configuration of the liquid crystal display device according to the second embodiment is similar to that of the first embodiment. The device is different in that the part of the transparent area 203 opposes the whole protuberance 206a as illustrated in FIG. 4A. To do this, each of the transparent area 203 and the protuberance 206a is made in a form of a circle. Note that it may be made in a form of a triangle or a rectangle.

An area designated by (1) in FIG. 4A has a protuberance though the area does not have a color filter layer as in FIG. 4B. The area's ratio in size is about 3%. An area designated by (2) in FIG. 4A has neither a protuberance nor a color filter layer as in FIG. 4B. The area's ratio in size is about 17%. There is not an area that has both a protuberance and a color filter layer as in FIG. 4B. Therefore, the value designated by (3) in FIG. 4B is 0%. An area designated by (4) in FIG. 4A has a color filter layer though the area does not have a protuberance as in FIG. 4B. The area's ratio in size is about 80%. Thus, a chromaticity of red color and a reflectance are set desirably.

It is assumed that a size of the area designated by (1) is S1 and a size of the areas designated by (2) is S2, even if a relative position between the protuberance 206a and the transparent area 203 varies when manufacturing the device, the ratio of S1 and S2, which is a ratio between the size of the transparent area's part opposing the structure's part and the size of the rest of the transparent area is maintained. For example, if the transparent area 203 is shifted towards right in FIG. 4A, the area designated by (2) becomes thick in a part while the area becomes thin in another part. Thus, the ratio is maintained. Thereby, the chromaticity of red color and the reflectance are maintained.

Ratios are also set in the sub-pixel having the green color filter layer to set a chromaticity of green color and a reflectance desirably. The chromaticity of green color and the reflectance are also maintained.

Thus, a desirable reflectance and a white balance value are set and the reflectance and the white balance value are prevented from shifting even if a relative position between the protuberance and the transparent area varies.

Note that, in the first and second embodiments, the transparent area is formed in each of the red color filter layer and the green color filter layer, but a color or colors and a number of the color filter layer in which the transparent area is formed is arbitrary.

Therefore, the transparent area may be formed in a part of the blue color filter layer, the part opposing a corresponding reflective electrode. In the case, a transparent area's ratio in size against the blue color filter layer's part opposing the corresponding reflective electrode is set smaller than a transparent area's ratio in size against the red color filter layer's part opposing the corresponding reflective electrode, and the transparent area's ratio in size against the red color filter layer's part opposing the corresponding reflective electrode is set smaller than a transparent area's ratio in size against the green color filter layer's part opposing the corresponding reflective electrode. Note that such order in ratio is arbitrary.

In the embodiments, the cell-gap adjusting layer is formed in the opposing substrate, but the cell-gap adjusting layer may be formed in the array substrate.

In the embodiments, the pixel is divided into the reflective display area and the transmissive display area, but an area of all pixels may be divided into a first area consisting of pixels, each pixel having only a reflective display area, and a second area consisting of pixels, each pixel having only a transmissive display area.

What is claimed is:

1. A liquid crystal display device comprising:
    an array substrate and an opposing substrate;
    a liquid crystal layer formed between the array substrate and the opposing substrate;
    transmissive electrodes formed in the array substrate;
    reflective electrodes formed in the array substrate;
    a color filter layer formed in the opposing substrate;
    an opposing electrode formed on the color filter layer;
    transparent areas which do not add colors to light, each transparent area being formed in a part of the color filter layer which opposes a corresponding reflective electrode; and
    structures configured to make liquid crystal molecules in the liquid crystal layer incline, each structure being formed either on a reflective electrode or on a corresponding part of the opposing electrode which opposes the reflective electrode, wherein
    a part of each transparent area opposes a part of a corresponding structure,
    each transparent area and each corresponding opposing structure are configured to keep a ratio constant, the ratio being a ratio between a size of each transparent area opposing the corresponding structure area and a size of the rest of the transparent area, and
    each transparent area crosses the corresponding opposing structure.

2. The liquid crystal display device according to claim 1, wherein
    the liquid crystal layer consists of liquid crystal molecules having a negative dielectric anisotropy.

3. The liquid crystal display device according to claim 1, wherein
    each structure is a protuberance, and
    each protuberance consists of dielectric.

4. The liquid crystal display device according to claim 1, wherein
    the color filter layer is divided into three groups of areas, the areas of the first group being red color filters capable of adding red color to light, the areas of the second group being green color filters capable of adding green color to light, the areas of the third group being blue color filters capable of adding blue color to light, and
    the transparent areas are formed at least in the areas of one of the groups.

5. The liquid crystal display device according to claim 1, wherein
    the color filter layer is divided into three groups of areas, the areas of the first group being red color filters capable of adding red color to light, the areas of the second group being green color filters capable of adding green color to light, the areas of the third group being blue color filters capable of adding blue color to light,
    the transparent area is formed in the areas of the each group, and a ratio of a transparent area in size against the blue color filter opposing the corresponding reflective electrode is set smaller than a ratio of a transparent area in size against the red color filter opposing the corresponding reflective electrode, and the ratio of the transparent area in size against the red color filter layer opposing the corresponding reflective electrode is set smaller than a ratio of a transparent area in size against the green color filter layer opposing the corresponding reflective electrode.

6. A liquid crystal display device comprising:
an array substrate and an opposing substrate;
a liquid crystal layer formed between the array substrate and the opposing substrate;
transmissive electrodes formed in the array substrate;
reflective electrodes formed in the array substrate;
a color filter layer formed in the opposing substrate;
an opposing electrode formed on the color filter layer;
transparent areas which do not add colors to light, each transparent area being formed in a part of the color filter layer which opposes a corresponding reflective electrode; and
structures configured to make liquid crystal molecules in the liquid crystal layer incline, each structure being formed either on a reflective electrode or on a corresponding part of the opposing electrode which opposes the reflective electrode, wherein
a part of each transparent area opposes a part of a corresponding structure,
each transparent area and each corresponding opposing structure are configured to keep a ratio constant, the ratio being a ratio between a size of each transparent area opposing the corresponding structure area and a size of the rest of the transparent area, and
each transparent area crosses the corresponding opposing structure to keep the ratio constant if a relative position between the structure and the transparent area varies.

7. The liquid crystal display device according to claim 6, wherein
the liquid crystal layer consists of liquid crystal molecules having a negative dielectric anisotropy.

8. The liquid crystal display device according to claim 6, wherein
each structure is a protuberance, and
each protuberance consists of dielectric.

9. The liquid crystal display device according to claim 6, wherein
the color filter layer is divided into three groups of areas, the areas of the first group being red color filters capable of adding red color to light, the areas of the second group being green color filters capable of adding green color to light, the areas of the third group being blue color filters capable of adding blue color to light, and
the transparent areas are formed at least in the areas of one of the groups.

10. The liquid crystal display device according to claim 6, wherein
the color filter layer is divided into three groups of areas, the areas of the first group being red color filters capable of adding red color to light, the areas of the second group being green color filters capable of adding green color to light, the areas of the third group being blue color filters capable of adding blue color to light,
the transparent area is formed in the areas of the each group, and
a ratio of a transparent area in size against the blue color filter opposing the corresponding reflective electrode is set smaller than a ratio of a transparent area in size against the red color filter opposing the corresponding reflective electrode, and the ratio of the transparent area in size against the red color filter layer opposing the corresponding reflective electrode is set smaller than a ratio of a transparent area in size against the green color filter layer opposing the corresponding reflective electrode.

11. A liquid crystal display device comprising:
an array substrate and an opposing substrate;
a liquid crystal layer formed between the array substrate and the opposing substrate;
transmissive electrodes formed in the array substrate;
reflective electrodes formed in the array substrate;
a color filter layer formed in the opposing substrate;
an opposing electrode formed on the color filter layer;
transparent areas which do not add colors to light, each transparent area being formed in a part of the color filter layer which opposes a corresponding reflective electrode; and
structures configured to make liquid crystal molecules in the liquid crystal layer incline, each structure being formed either on a reflective electrode or on a corresponding part of the opposing electrode which opposes the reflective electrode, wherein
a part of each transparent area opposes a part of a corresponding structure,
each transparent area and each corresponding opposing structure are configured to keep a ratio constant, the ratio being a ratio between a size of each transparent area opposing the corresponding structure area and a size of the rest of the transparent area,
each structure is a protuberance, and
each of the protuberance and the transparent area is made in a form of a rectangle.

12. The liquid crystal display device according to claim 11, wherein
the liquid crystal layer consists of liquid crystal molecules having a negative dielectric anisotropy.

13. The liquid crystal display device according to claim 11, wherein
each structure is a protuberance, and
the protuberance consists of dielectric.

14. The liquid crystal display device according to claim 11, wherein
the color filter layer is divided into three groups of areas, the areas of the first group being red color filters capable of adding red color to light, the areas of the second group being green color filters capable of adding green color to light, the areas of the third group being blue color filters capable of adding blue color to light, and
the transparent areas are formed at least in the areas of one of the groups.

15. The liquid crystal display device according to claim 11, wherein
the color filter layer is divided into three groups of areas, the areas of the first group being red color filters capable of adding red color to light, the areas of the second group being green color filters capable of adding green color to light, the areas of the third group being blue color filters capable of adding blue color to light,
the transparent area is formed in the areas of the each group, and
a ratio of a transparent area in size against the blue color filter opposing the corresponding reflective electrode is set smaller than a ratio of a transparent area in size against the red color filter opposing the corresponding reflective electrode, and the ratio of the transparent area in size against the red color filter layer opposing the corresponding reflective electrode is set smaller than a ratio of a transparent area in size against the green color filter layer opposing the corresponding reflective electrode.

16. A liquid crystal display device comprising:
an array substrate and an opposing substrate;
a liquid crystal layer formed between the array substrate and the opposing substrate;
transmissive electrodes formed in the array substrate;
reflective electrodes formed in the array substrate;
a color filter layer formed in the opposing substrate;
an opposing electrode formed on the color filter layer;
transparent areas which do not add colors to light, each transparent area being formed in a part of the color filter layer which opposes a corresponding reflective electrode; and
structures configured to make liquid crystal molecules in the liquid crystal layer incline, each structure being formed either on a reflective electrode or on a corresponding part of the opposing electrode which opposes the reflective electrode, wherein
a part of each transparent area opposes a part of a corresponding structure,
each transparent area and each corresponding opposing structure are configured to keep a ratio constant, the ratio being a ratio between a size of each transparent area opposing the corresponding structure area and a size of the rest of the transparent area,
each transparent area crosses the corresponding opposing structure, and
each structure is a protuberance.

17. The liquid crystal display device according to claim 16, wherein
the liquid crystal layer consists of liquid crystal molecules having a negative dielectric anisotropy.

18. The liquid crystal display device according to claim 16, wherein
each protuberance consists of dielectric.

19. The liquid crystal display device according to claim 16, wherein
the color filter layer is divided into three groups of areas, the areas of the first group being red color filters capable of adding red color to light, the areas of the second group being green color filters capable of adding green color to light, the areas of the third group being blue color filters capable of adding blue color to light, and
the transparent areas are formed at least in the areas of one of the groups.

20. The liquid crystal display device according to claim 16, wherein
the color filter layer is divided into three groups of areas, the areas of the first group being red color filters capable of adding red color to light, the areas of the second group being green color filters capable of adding green color to light, the areas of the third group being blue color filters capable of adding blue color to light,
the transparent area is formed in the areas of the each group, and
a ratio of a transparent area in size against the blue color filter opposing the corresponding reflective electrode is set smaller than a ratio of a transparent area in size against the red color filter opposing the corresponding reflective electrode, and the ratio of the transparent area in size against the red color filter layer opposing the corresponding reflective electrode is set smaller than a ratio of a transparent area in size against the green color filter layer opposing the corresponding reflective electrode.

21. A liquid crystal display device comprising:
an array substrate and an opposing substrate;
a liquid crystal layer formed between the array substrate and the opposing substrate;
transmissive electrodes formed in the array substrate;
reflective electrodes formed in the array substrate;
a color filter layer formed in the opposing substrate;
an opposing electrode formed on the color filter layer;
transparent areas which do not add colors to light, each transparent area being formed in a part of the color filter layer which opposes a corresponding reflective electrode; and
structures configured to make liquid crystal molecules in the liquid crystal layer incline, each structure being formed either on a reflective electrode or on a corresponding part of the opposing electrode which opposes the reflective electrode, wherein
a part of each transparent area opposes a part of a corresponding structure,
each transparent area and each corresponding opposing structure are configured to keep a ratio constant, the ratio being a ratio between a size of each transparent area opposing the corresponding structure area and a size of the rest of the transparent area,
each transparent area crosses the corresponding opposing structure to keep the ratio constant if a relative position between the structure and the transparent area varies, and
each structure is a protuberance.

22. The liquid crystal display device according to claim 21, wherein
the liquid crystal layer consists of liquid crystal molecules having a negative dielectric anisotropy.

23. The liquid crystal display device according to claim 21, wherein
each protuberance consists of dielectric.

24. The liquid crystal display device according to claim 21, wherein
the color filter layer is divided into three groups of areas, the areas of the first group being red color filters capable of adding red color to light, the areas of the second group being green color filters capable of adding green color to light, the areas of the third group being blue color filters capable of adding blue color to light, and
the transparent areas are formed at least in the areas of one of the groups.

25. The liquid crystal display device according to claim 21, wherein
the color filter layer is divided into three groups of areas, the areas of the first group being red color filters capable of adding red color to light, the areas of the second group being green color filters capable of adding green color to light, the areas of the third group being blue color filters capable of adding blue color to light,
the transparent area is formed in the areas of the each group, and
a ratio of a transparent area in size against the blue color filter opposing the corresponding reflective electrode is set smaller than a ratio of a transparent area in size against the red color filter opposing the corresponding reflective electrode, and the ratio of the transparent area in size against the red color filter layer opposing the corresponding reflective electrode is set smaller than a ratio of a transparent area in size against the green color filter layer opposing the corresponding reflective electrode.

26. A liquid crystal display device comprising:
an array substrate and an opposing substrate;
a liquid crystal layer formed between the array substrate and the opposing substrate;
transmissive electrodes formed in the array substrate;
reflective electrodes formed in the array substrate;
a color filter layer formed in the opposing substrate;
an opposing electrode formed on the color filter layer;
transparent areas which do not add colors to light, each transparent area being formed in a part of the color filter layer which opposes a corresponding reflective electrode; and
structures configured to make liquid crystal molecules in the liquid crystal layer incline, each structure being formed either on a reflective electrode or on a corresponding part of the opposing electrode which opposes the reflective electrode, wherein
a part of each transparent area opposes a part of a corresponding structure,
each transparent area and each corresponding opposing structure are configured to keep a ratio constant, the ratio being a ratio between a size of each transparent area opposing the corresponding structure area and a size of the rest of the transparent area,
each transparent area crosses the corresponding opposing structure, and
each structure forms a slit where the reflective electrode or the part of the opposing electrode is removed partially.

27. The liquid crystal display device according to claim 26, wherein
the liquid crystal layer consists of liquid crystal molecules having a negative dielectric anisotropy.

28. The liquid crystal display device according to claim 26, wherein
the color filter layer is divided into three groups of areas, the areas of the first group being red color filters capable of adding red color to light, the areas of the second group being green color filters capable of adding green color to light, the areas of the third group being blue color filters capable of adding blue color to light, and
the transparent areas are formed at least in the areas of one of the groups.

29. The liquid crystal display device according to claim 26, wherein
the color filter layer is divided into three groups of areas, the areas of the first group being red color filters capable of adding red color to light, the areas of the second group being green color filters capable of adding green color to light, the areas of the third group being blue color filters capable of adding blue color to light,
the transparent area is formed in the areas of the each group, and
a ratio of a transparent area in size against the blue color filter opposing the corresponding reflective electrode is set smaller than a ratio of a transparent area in size against the red color filter opposing the corresponding reflective electrode, and the ratio of the transparent area in size against the red color filter layer opposing the corresponding reflective electrode is set smaller than a ratio of a transparent area in size against the green color filter layer opposing the corresponding reflective electrode.

30. A liquid crystal display device comprising:
an array substrate and an opposing substrate;
a liquid crystal layer formed between the array substrate and the opposing substrate;
transmissive electrodes formed in the array substrate;
reflective electrodes formed in the array substrate;
a color filter layer formed in the opposing substrate;
an opposing electrode formed on the color filter layer;
transparent areas which do not add colors to light, each transparent area being formed in a part of the color filter layer which opposes a corresponding reflective electrode; and
structures configured to make liquid crystal molecules in the liquid crystal layer incline, each structure being formed either on a reflective electrode or on a corresponding part of the opposing electrode which opposes the reflective electrode, wherein
a part of each transparent area opposes a part of a corresponding structure,
each transparent area and each corresponding opposing structure are configured to keep a ratio constant, the ratio being a ratio between a size of each transparent area opposing the corresponding structure area and a size of the rest of the transparent area,
each transparent area crosses the corresponding opposing structure to keep the ratio constant if a relative position between the structure and the transparent area varies, and
each structure forms a slit where the reflective electrode or the part of the opposing electrode is removed partially.

31. The liquid crystal display device according to claim 30, wherein
the liquid crystal layer consists of liquid crystal molecules having a negative dielectric anisotropy.

32. The liquid crystal display device according to claim 30, wherein
the color filter layer is divided into three groups of areas, the areas of the first group being red color filters capable of adding red color to light, the areas of the second group being green color filters capable of adding green color to light, the areas of the third group being blue color filters capable of adding blue color to light, and
the transparent areas are formed at least in the areas of one of the groups.

33. The liquid crystal display device according to claim 30, wherein
the color filter layer is divided into three groups of areas, the areas of the first group being red color filters capable of adding red color to light, the areas of the second group being green color filters capable of adding green color to light, the areas of the third group being blue color filters capable of adding blue color to light,
the transparent area is formed in the areas of the each group, and
a ratio of a transparent area in size against the blue color filter opposing the corresponding reflective electrode is set smaller than a ratio of a transparent area in size against the red color filter opposing the corresponding reflective electrode, and the ratio of the transparent area in size against the red color filter layer opposing the corresponding reflective electrode is set smaller than a ratio of a transparent area in size against the green color filter layer opposing the corresponding reflective electrode.

* * * * *